United States Patent

Fornell

[19]

[11] Patent Number: 6,019,487
[45] Date of Patent: Feb. 1, 2000

[54] LAMP HOUSING SECUREMENT

[75] Inventor: Arthur W. Fornell, Livonia, Mich.

[73] Assignee: Chrysler Corporation, Auburn Hills, Mich.

[21] Appl. No.: 09/054,170

[22] Filed: Apr. 2, 1998

[51] Int. Cl.[7] ................................................ F21V 21/00
[52] U.S. Cl. .................. 362/368; 362/311; 362/549; 248/27.1
[58] Field of Search .................. 362/147, 311, 362/368, 374, 546, 549; 248/27.1

[56] References Cited

U.S. PATENT DOCUMENTS

| | | | |
|---|---|---|---|
| 3,708,850 | 1/1973 | Martin | 248/27.1 |
| 4,342,074 | 7/1982 | Bull et al. | 362/365 |
| 4,406,936 | 9/1983 | Ohashi | 248/27.1 |
| 4,460,942 | 7/1984 | Pizzuti et al. | 362/217 |
| 4,473,870 | 9/1984 | Sorenson | 362/311 |
| 4,499,528 | 2/1985 | Hawlitzki | 362/368 |
| 4,703,400 | 10/1987 | Vescio et al. | 362/549 |
| 4,722,032 | 1/1988 | Kulka | 362/549 |
| 4,965,703 | 10/1990 | Whalen | 362/549 |
| 5,546,288 | 8/1996 | Van Order et al. | 362/490 |
| 5,863,016 | 1/1999 | Makwinski et al. | 248/27.1 |

*Primary Examiner*—Alan Cariaso
*Attorney, Agent, or Firm*—Lawrence J. Shurupoff

[57] ABSTRACT

A lamp housing is removably mounted in a panel opening by a detent system that exerts a wedge lock action against edge areas of the panel opening. The lamp housing includes a light-transmitting fascia plate normally seated against the panel and at least one swingable detent adapted to exert pressure against an edge of the panel opening. The detent has a swing axis spaced an appreciable distance from the wedge lock surface so that the wedge lock surface has a substantial travel distance between the operating and retracted positions of the detent.

6 Claims, 3 Drawing Sheets

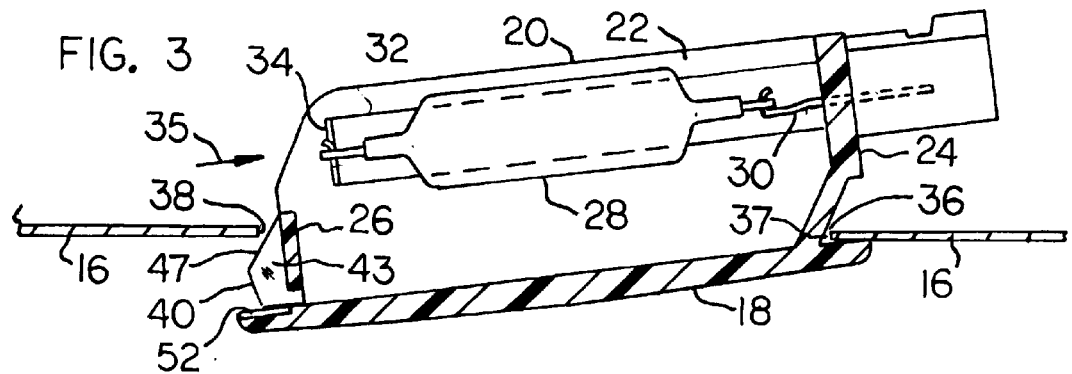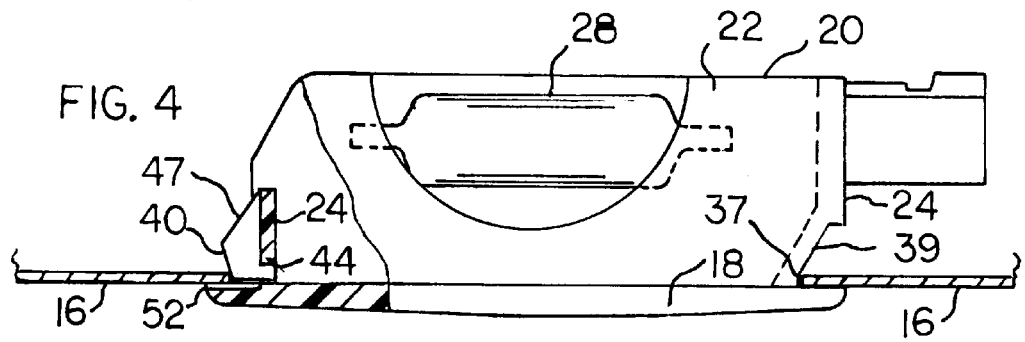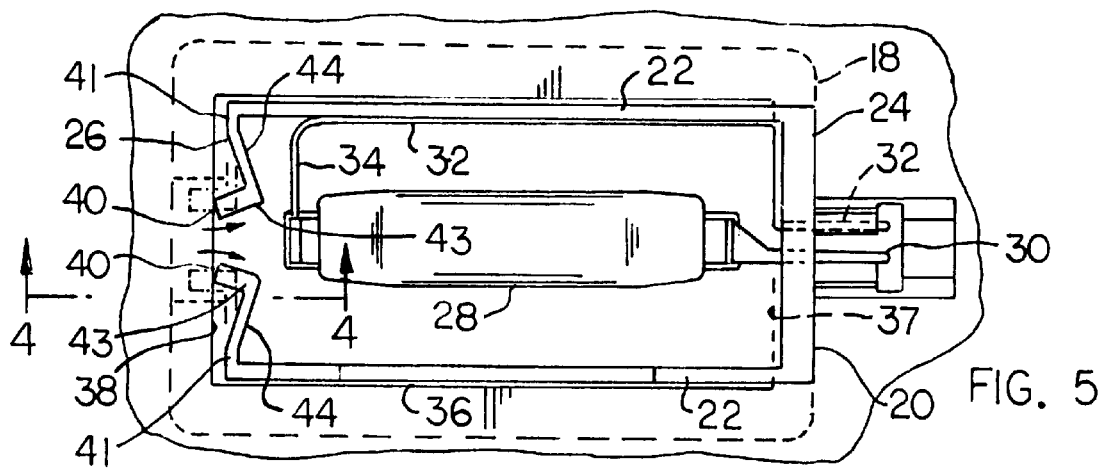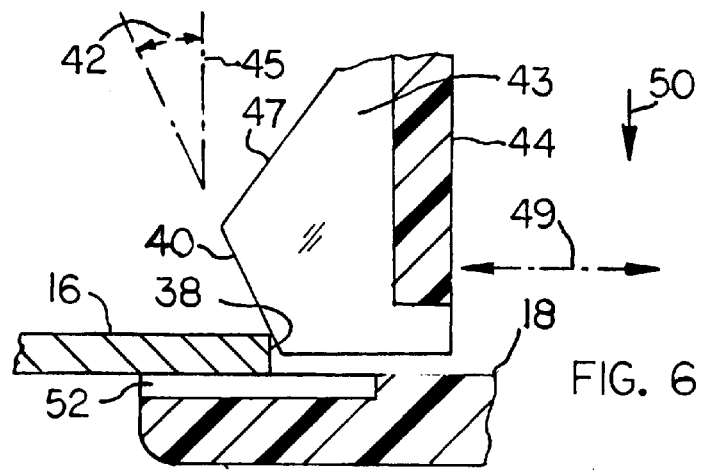

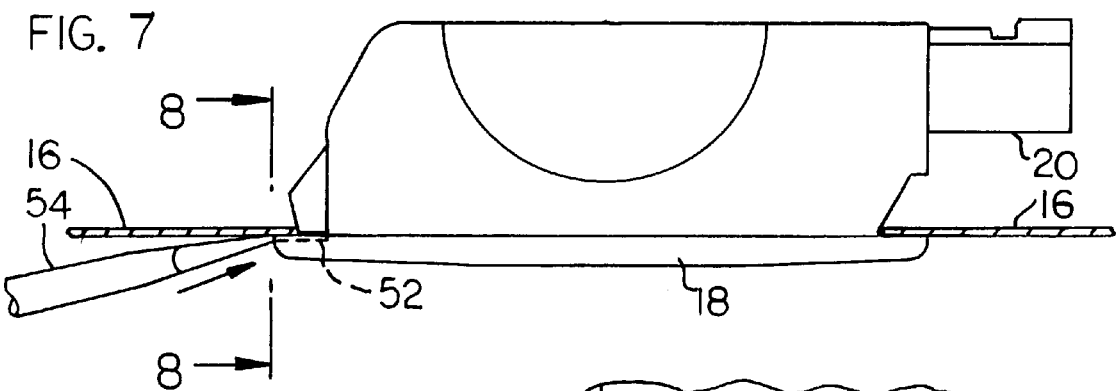
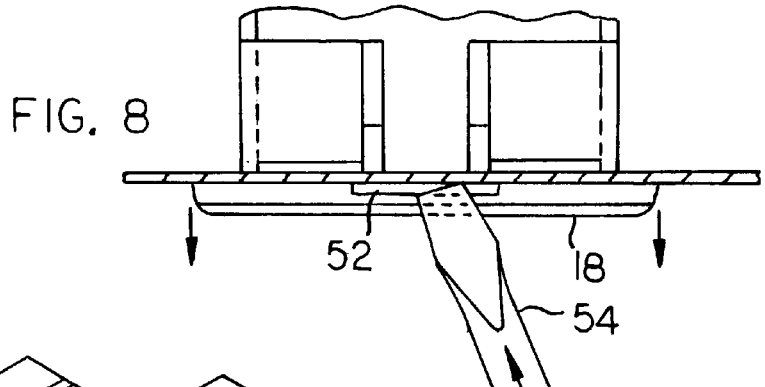
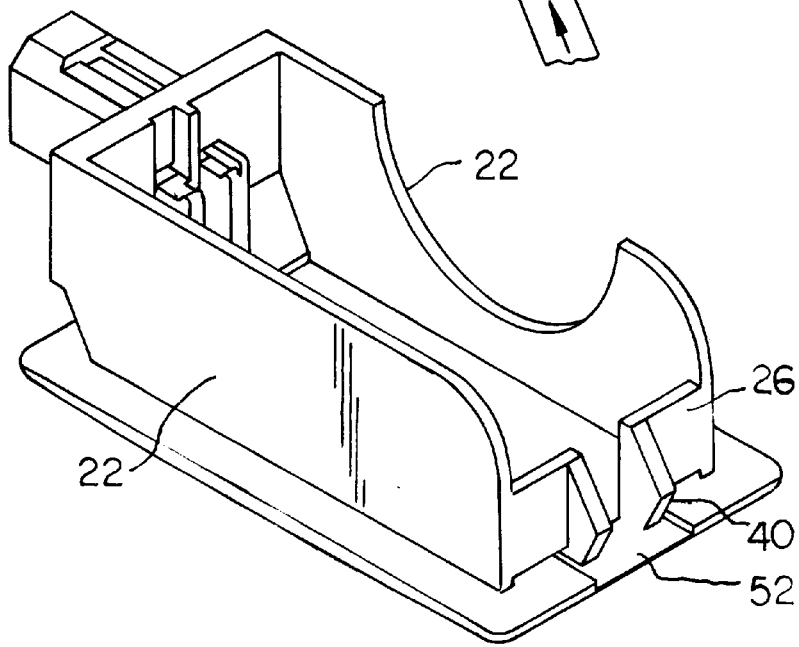

LAMP HOUSING SECUREMENT

BACKGROUND AND SUMMARY OF THE INVENTION

1. Field of the Invention

The present invention relates to a lamp housing, and particularly to a lamp housing capable of being easily installed and removed from a panel opening in an automotive vehicle. The invention has special utility as a lamp housing in the trunk compartment of an automotive vehicle. Lamps are commonly mounted in the trunk compartments of automotive vehicles for illuminating the compartment when the trunk lid is raised to gain access to the compartment.

2. Description of Prior Developments

Prior to the present invention, various improvements have been made in connection with mechanisms for mounting lamp housings in panel openings. Such improvements have sometimes involved low cost mounting devices that securely mount the lamp housing in a panel opening, but at the same time permit removal of the lamp housing, or at least the window portion of the lamp housing, in order to permit replacement of a burned-out lamp.

U.S. Pat. No. 3,708,850, issued to R. Martin, shows a torsion bar latch mechanism for securing a lamp housing in a panel opening. Two twistable torsion bars are located at opposite ends of a lamp housing for engagement with an edge of the panel opening. Each torsion bar has a lug that can be swung toward the lamp housing to permit passage of the lamp housing through the panel opening.

U.S. Pat. No. 4,342,074, issued to D. Bull, shows a lamp housing having deflectable latch arms integral with side walls of the housing to engage facial edge areas of a panel opening. Each latch arm has angled ramp surfaces that enable the latch arms to have snap-type engagements with the panel surfaces.

SUMMARY OF THE INVENTION

The present invention is directed to a lamp housing having an integral swingable detent adapted to produce pressure engagement with an edge of a panel opening, whereby the lamp housing can maintain a rattle-free mounting in the panel opening. The lamp housing has a transparent or translucent fascia plate adapted to completely cover the panel opening so that the lamp housing is in a concealed condition extending behind the panel. A screw driver slot is formed in an edge of the fascia plate to enable a technician to pry the fascia plate away from the panel, e.g. when it is desired to remove the housing from the panel opening for lamp bulb replacement purposes.

Further features of the invention will be apparent from the attached drawings and descriptions of a lamp housing embodying the invention.

BRIEF DESCRIPTION OF THE DRAWINGS

FIG. 3 is a sectional view of the FIG. 2 lamp housing, taken with the lamp housing in a partially installed position.

FIG. 4 is a view taken in the same direction as FIG. 3, but showing the lamp housing installed in the panel opening.

FIG. 5 is a top plan view of the FIG. 4 lamp housing in its installed position.

FIG. 6 is a fragmentary sectional view of the FIG. 4 lamp housing on a larger scale and showing features not apparent in FIG. 4.

FIG. 7 is a side elevational view of the FIG. 4 lamp housing and illustrating a screw driver that can be used to remove the lamp housing from the panel opening.

FIG. 8 is an end view of the lamp housing depicted in FIG. 7. FIG. 8 is taken along line 8—8 in FIG. 7.

FIG. 9 is a perspective view of the lamp housing depicted in FIGS. 2 through 8. In the figures, like reference characters designate like parts.

DESCRIPTION OF A PREFERRED EMBODIMENT OF THE INVENTION

Figure 1:
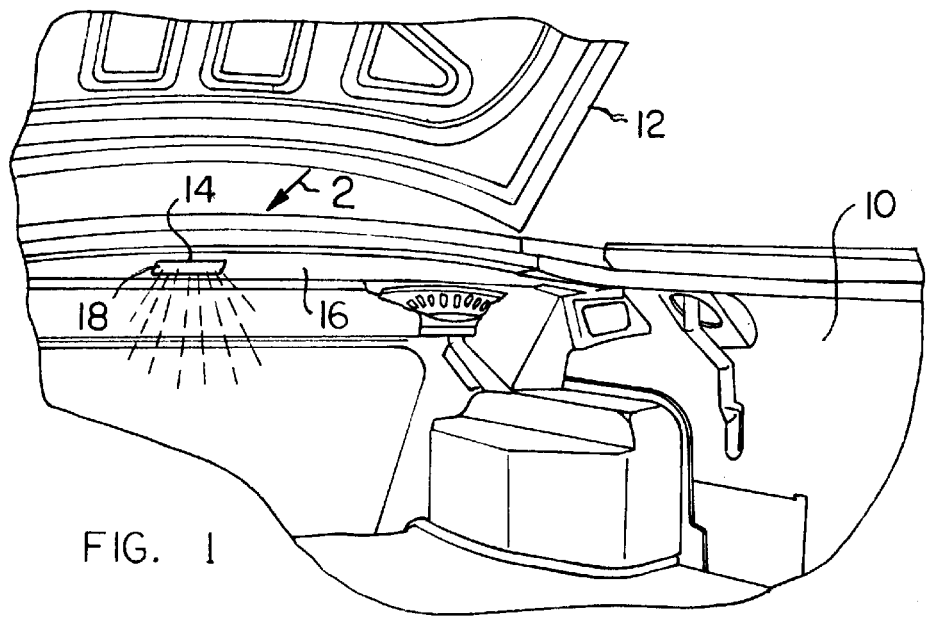
FIG. 1 is a fragmentary perspective view of a vehicle trunk compartment having a lamp housing of the present invention installed in a compartment panel.
Figure 2:
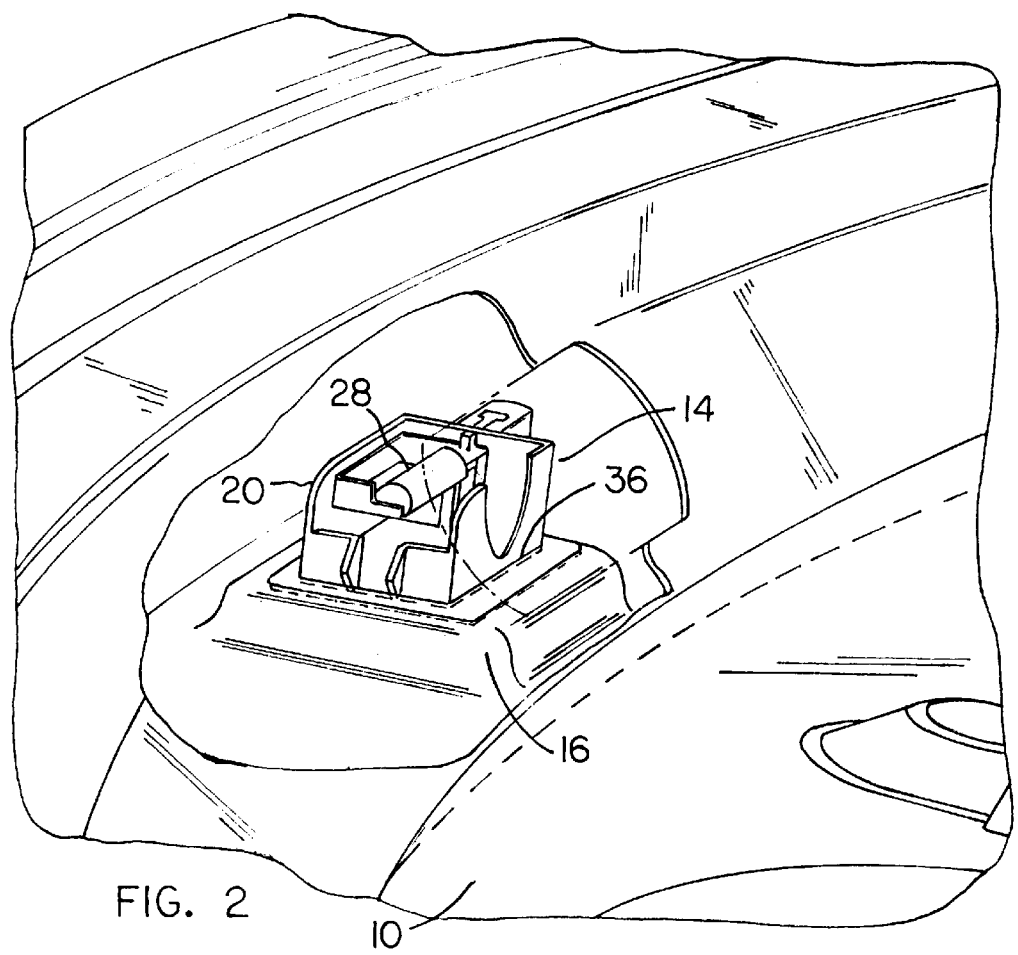
FIG. 2 is an enlarged fragmentary perspective view taken generally in the direction of arrow 2 in FIG. 1, and showing some features of the lamp housing not visible in FIG. 1.

Referring to FIGS. 1 and 2, there is shown an automobile trunk compartment 10 having a lid 12 that can be opened and closed to gain access to the compartment, while normally concealing the contents of the compartment against unauthorized removal. When the trunk lid 12 is opened the compartment is illuminated by a small lamp assembly 14 mounted in the rear package shelf 16 of the compartment. FIG. 1 shows light rays emerging from a front fascia plate 18 of the lamp housing into the compartment. The lamp housing 20 is shown more completely in FIG. 2 (in the concealed space behind rear package shelf panel 16).

Referring to FIGS. 3 through 6, lamp housing 20 includes a one piece plastic housing body that includes fascia plate 18, two side walls 22 extending right angularly from fascia plate 18, and two end walls 24 and 26 extending transversely across the space encompassed by side walls 22. The housing body is formed of a transparent, or translucent material, so that fascia plate 18 transmits light rays from an incandescent lamp 28 into the trunk compartment (depicted in FIG. 1).

Lamp 28 is suitably mounted in the lamp housing so that the light rays are predominately directed normal to the fascia plate. Terminals 30 and 32 deliver current to the lamp. Each terminal has a hook end portion locking onto a wire loop electrode extending from the respective end of the lamp, such that the lamp can be removed from housing 20 (after the housing has been separated from panel 16). Terminal 32 has a resilient arm portion 34 that can be pushed in the arrow 35 direction to permit removal of the lamp from housing 20.

The present invention is concerned with the construction of housing end wall 26 (coacting with well 24), whereby the lamp housing can be securely but removably mounted in a rectangular opening 36 in panel 16. Perimeter areas of fascia plate 18 extend beyond the planes of walls 22, 24 and 26, so that when the lamp housing is installed in opening 36 the fascia plate completely covers the rectangular opening. Fascia plate 18 is adapted to seat flatly against the lower face of panel 16, as shown in FIGS. 4 and 7.

Housing end walls 24 and 26 have oppositely-facing wedge lock surfaces adapted to have pressure engagement with edges 37 and 38 of opening 36, such that fascia plate 18 seats firmly against panel 16. External surface 39 on end wall 24 extends at an acute angle to the plane of fascia plate 18 to form one wedge lock surface. External surfaces 40 on end wall 26 extends at an acute angle to the plane of fascia plate 18 to form additional wedge lock surfaces.

Lamp housing end wall 26 includes two similarly-constructed swingable detents extending from housing side walls 22 for swinging motion in a plane parallel to fascia plate 18 (the swing axis is normal to plate 18). As shown best in FIG. 5, each detent has an integral hinged connection 41 with the associated side wall 22, so that the respective detent can swing between the full line position and the dashed line position. Each detent includes a supporting arm portion 44 swingable around the axis of hinged connection 41, and a thickened wall portion 43 extending right angularly from the supporting arm portion. Each thickened wall portion 43 has the edge profile as depicted in FIGS. 3, 4 and 6.

Each thickened wall portion 43 has a wedge lock surface 40 acutely angled to the insertion plane 45 of the lamp housing, whereby the each wedge lock surface 40 prevents the lamp housing from inadvertent slippage out of the panel opening 36. As shown in FIG. 6 the angulation 42 of wedge lock surface 40 is approximately twenty five degrees.

Each thickened wall portion 43 has a cam surface 47 obtusely angled to the associated wedge lock surface 40. Insertion of the lamp housing into panel opening 36 can be accomplished by inserting the lamp housing obliquely upwardly to the FIG. 3 position, and then exerting a pushing force on fascia plate 18, such that cam surfaces 47 on the swingable detents ride on edge 38 of the panel opening.

The swingable nature of each detent allows the detents to be forced to retracted positions within panel opening 36, as shown in full lines in FIG. 5. As the lamp housing is pushed further through panel opening 36 the resilience of the detent swingable connections 41 with housing side walls 22 cause the detents to swing outwardly to the operating positions depicted in FIGS. 4 and 6.

The lamp housing is dimensioned so that when the swingable detents are in the operating positions, as shown in FIGS. 4 and 6, the detent supporting arm portions 44 are acutely angled very slightly to the planes of side walls 22. As shown in FIG. 5 the acute angulation of support arm 44 relative to wall 22 is about twenty to twenty-five degrees when the detent is in the retracted (full line) position. When the detent is in the operating (locking) position the acute angulation may be about five degrees. Such an angulation enables the detent to exert pressure on edge 38 of the panel opening (in the locking position of the detent). Also, such an angulation compensates for tolerances in the size of panel opening 36. The panel opening can be slightly undersize or slightly oversize while still keeping the detent system operational. The based wedge lock action ensures a rattle-free fit of the lamp housing in the panel opening.

An important feature of the invention is that wedge lock surfaces 40 engage the edge 38 of the panel opening rather than the rear (upper) surface of the panel. Variations in panel thickness do not adversely affect the wedge lock action. Typically panel 16 will be a steel panel having a thickness of about 0.078 inch. However, the panel thickness can vary from this value within specified drawing tolerances without adversely affecting wedge lock performance. The wedge lock action against edge 38 also enables the lamp housing to be removed by means of a prying operation.

Another important feature of the invention is the fact that each detent swings on a line (or plane) 49 that is substantially parallel to the plane of fascia plate 18. The wedge lock surface 40 exerts a locking pressure along line 49 (FIG. 6) that is normal to the direction 50 that the lamp housing would have to take in order to slip out of the panel opening. Any tendency of the lamp housing to move, or shift, in the arrow 50 direction is counteracted by the wedge lock pressure in the direction of line 49. Force line 49 is at right angles to the arrow 50 direction line, so that vibrational forces in the arrow 50 direction are effectively resisted.

FIG. 5 shows two swingable detents swingably attached to housing side walls 22. However, a satisfactory wedge lock action could be achieved with a single swingable detent. Thus, one of the swingable detents could be removed (not used), if so desired.

In order to facilitate removal of the lamp housing 20 from panel opening 36, a screw driver slot 52 is formed in the upper face of fascia plate 18, i.e. the face of plate 18 that seats against panel 16. Slot 52 has a depth dimension, as viewed in FIGS. 4 and 6, that is relatively small compared to its width dimension, as viewed in FIG. 8. The slot width dimension is preferably greater than the width dimension of a conventional flat blade screw driver, such that the screw driver blade 54 can be inserted into the slot, as depicted in FIGS. 7 and 8.

With the screw driver blade partially inserted into slot 52, the screw driver can be rotated around its longitudinal axis to a condition wherein the blade is crosswise relative to the slot width dimension. As the screw driver blade is rotated, the fascia plate 18 is pried away from panel 16, such that the lamp housing can be removed from the panel opening.

Each wedge lock surface 40 preferably has a length dimension (as viewed in FIGS. 4 and 6) that is somewhat less than the width dimension of a conventional screw driver blade. Therefore, when the screw driver blade is twisted around its longitudinal axis, the lamp housing is moved a sufficient distance to release wedge lock surfaces 40 from edge 38 of the panel opening. In a typical construction each wedge lock surface 40 has a length dimension of about five millimeters.

The swing axis of the detent is spaced an appreciable distance from the associated wedge lock surface 40. This is advantageous in that the wedge lock surface moves on a plane that is normal to the direction line 50 that the lamp housing would have to take in order to be displaced out of the panel opening. Also, the large swing arc around axis 41 enables the wedge lock surface to have a satisfactory travel distance without generating abnormal fatigue forces at the swing axis.

The drawings show specific forms that the invention can take. However, it will be appreciated that the invention can take various forms and configurations.

I claim:

1. A lamp housing adapted for removable mounting in a panel opening, said lamp housing comprising: a plastic housing body that includes a fascia plate adapted to seat against one face of a panel, and side walls extending right angularly from said fascia plate for extension through an opening in the panel; said housing body having a first end wall adapted to engage a first edge of the panel opening, and a second end wall adapted to engage a second edge of the panel opening; said second end wall comprising at least one swingable detent having a wedge lock surface adapted to exert pressure against the second edge of the panel opening when said fascia plate is seated against said one panel face, whereby said housing body has a rattle-free fit in the panel opening; said detent being swingable between a first position overhanging said second edge of the panel opening and a retracted position located within the panel opening; said detent having a swing axis spaced apart from said wedge lock surface, such that said wedge lock surface moves on a line substantially parallel to said fascia plate during movement of said detent from the first position to the retracted position, and wherein the swing axis of said detent is normal to said fascia plate.

2. The lamp housing of claim 1, wherein said wedge lock surface is acutely angled to a housing body insertion plane extending normal to said fascia plate.

3. The lamp housing of claim 2, wherein said wedge lock surface is acutely angled to said insertion plane at an angle of approximately twenty five degrees.

4. A lamp housing adapted for removable mounting in a panel opening, said lamp housing comprising: a plastic housing body that includes a fascia plate adapted to seat against one face of a panel, and side walls extending right angularly from said fascia plate for extension through an opening in the panel; said housing body having a first end wall adapted to engage a first edge of the panel opening, and a second end wall adapted to engage a second edge of the panel opening; said second end wall comprising at least one swingable detent having a wedge lock surface adapted to exert pressure against the second edge of the panel opening when said fascia plate is seated against said one panel face, whereby said housing body has a rattle-free fit in the panel opening; said detent being swingable between a first position overhanging said second edge of the panel opening and a retracted position located within the panel opening; said detent having a swing axis spaced apart from said wedge lock surface, such that said wedge lock surface moves on a line substantially parallel to said fascia plate during movement of said detent from the first position to the retracted position, and wherein said detent is swingably connected to one of said side walls for swinging motion around a swing axis normal to said fascia plate.

5. The lamp housing of claim 1, wherein said fascia plate has perimeter areas thereof extending beyond the planes of the associated side walls and end walls, whereby said fascia plate is adapted to completely cover the panel opening.

6. The lamp housing of claim 1, wherein said detent has a cam surface obtusely angled to said wedge lock surface for engagement against an edge of a panel opening during insertional movement of the housing body into the panel opening.

\* \* \* \* \*